(No Model.) 2 Sheets—Sheet 1.

C. J. VAN DEPOELE.
SYSTEM OF ELECTRICAL DISTRIBUTION.

No. 488,928. Patented Dec. 27, 1892.

Witnesses
H. A. Lamb
C. L. Sturtevant

Inventor
Charles J. Van Depoele
By his Attorney
Frankland Jannus (No Model.) 2 Sheets—Sheet 2.
C. J. VAN DEPOELE.
SYSTEM OF ELECTRICAL DISTRIBUTION.
No. 488,928. Patented Dec. 27, 1892.
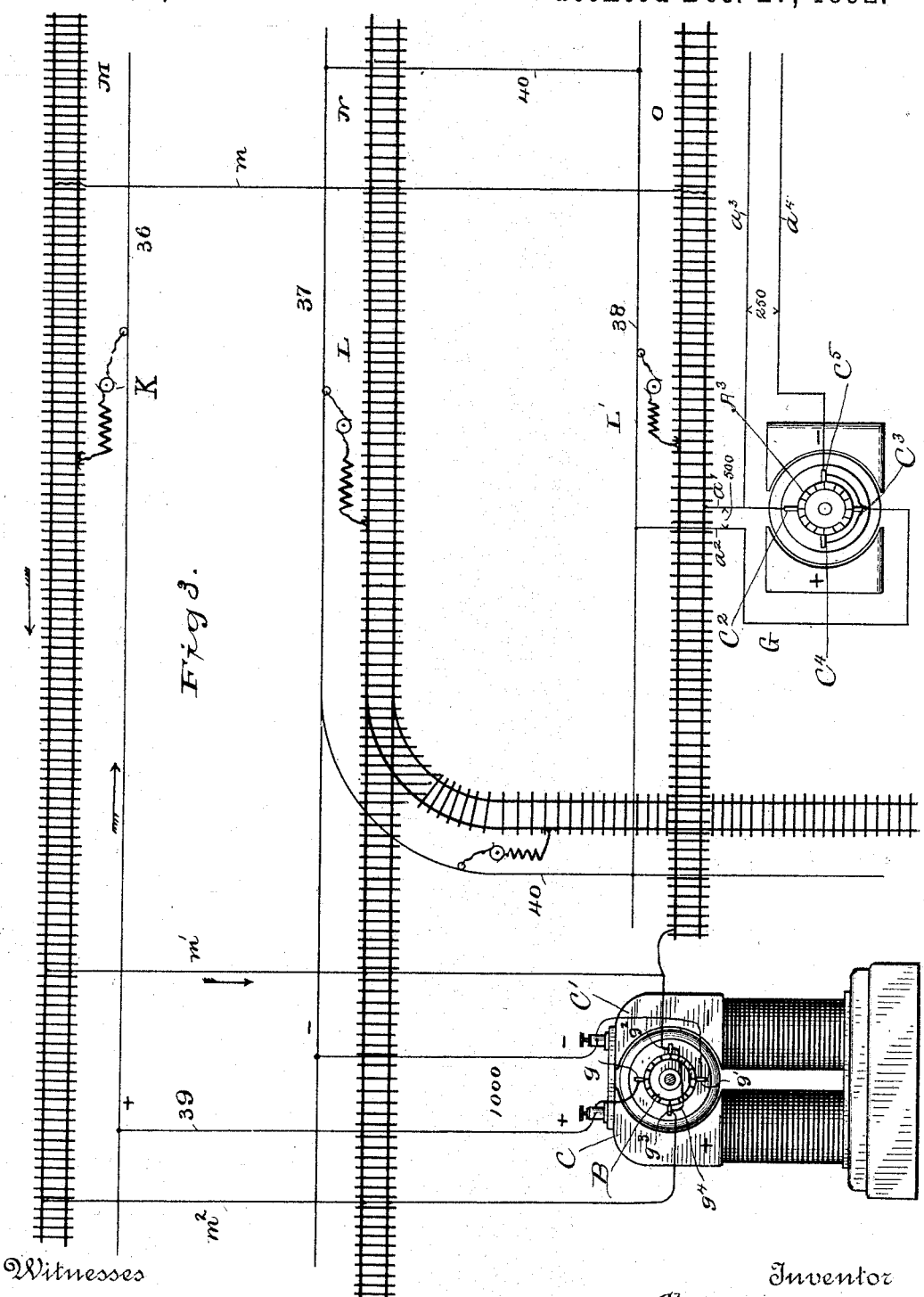
Witnesses
H. A. Lamb
C. L. Sturtevant
Inventor
Charles J. Van Depoele
By his Attorney
Frankland Jannus

UNITED STATES PATENT OFFICE.

CHARLES J. VAN DEPOELE, OF LYNN, MASSACHUSETTS; C. A. COFFIN AND ALBERT WAHL, EXECUTORS OF SAID VAN DEPOELE, DECEASED, ASSIGNORS TO THE THOMSON-HOUSTON ELECTRIC COMPANY, OF BOSTON, MASSACHUSETTS.

SYSTEM OF ELECTRIC DISTRIBUTION.

SPECIFICATION forming part of Letters Patent No. 488,928, dated December 27, 1892.

Application filed June 27, 1889. Serial No. 315,766. (No model.)

*To all whom it may concern:*

Be it known that I, CHARLES J. VAN DEPOELE, a citizen of the United States, residing at Lynn, in the county of Essex and State of Massachusetts, have invented certain new and useful Improvements in Systems of Electrical Distribution, of which the following is a description, reference being had to the accompanying drawings, and to the letters and figures of reference marked thereon.

My invention relates to a new and improved system of distributing electric currents by means of which a plurality of circuits can be supplied with current of the desired potential from a generator giving currents of a potential above that which is required.

The invention comprises a system by which the potential of a generator or a dynamo electric machine receiving current instead of generating it and distributing the same as a counter electro motive force device, is divided among a plurality of circuits to be supplied, the potential of the original current being divided equally, so that, for example, supposing the machine to be located centrally with respect to two parts of an electric railway system or any desired number of circuits connected together to form two groups, the said generator might handle currents of one thousand volts and distribute currents of five hundred volts to each of the systems to be supplied. This system will be found useful under various circumstances; it is not restricted to electric railway circuits *per se*, as will appear from the following description, taken in connection with the accompanying drawings, in which—

Figure 1:
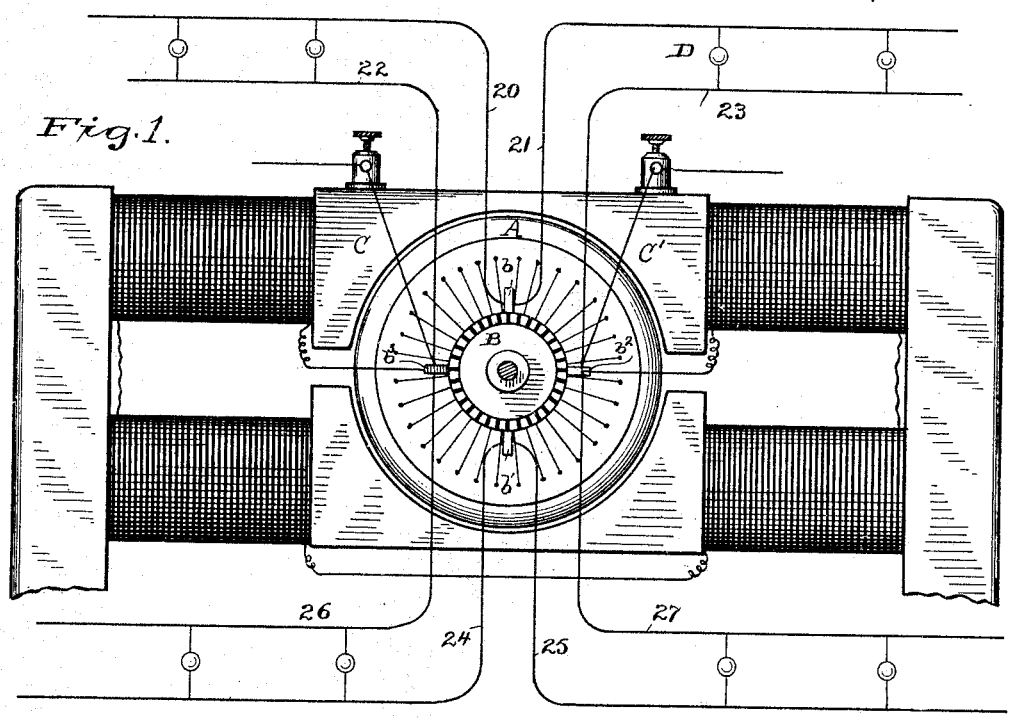
Figure 2:
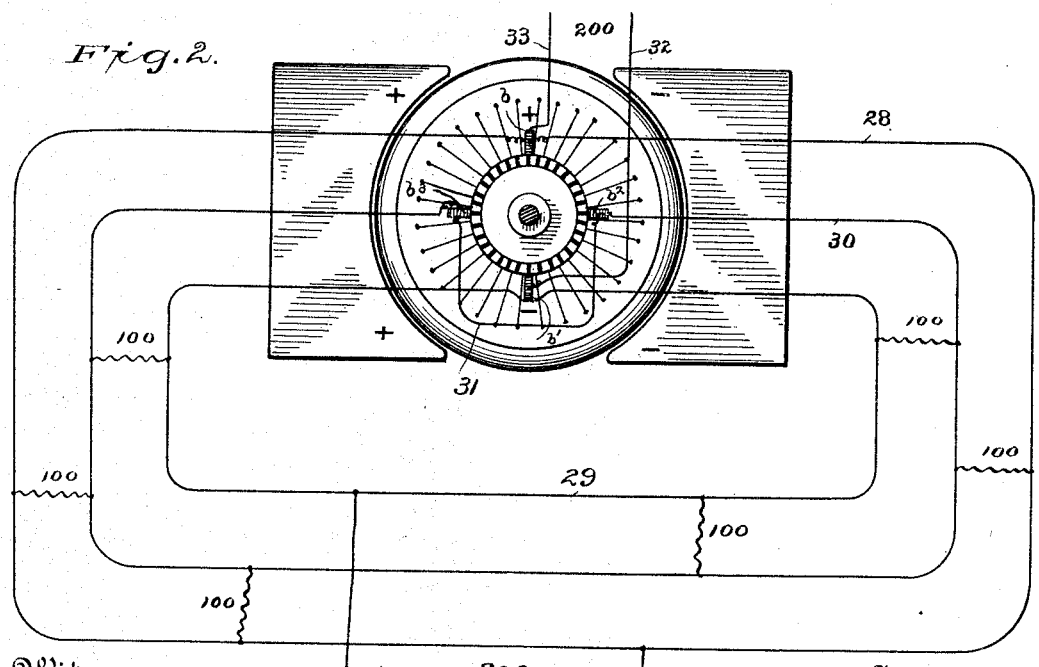

Figure 1 is a view in elevation showing a dynamo electric generator of the continuous current type having two sets of commutator brushes and independent circuits extending therefrom. Fig. 2 is a diagrammatic view showing a somewhat different arrangement of consumption circuits in connection with a source of continuous electric current. Fig. 3 is a diagrammatic view showing several lines of electric railway arranged and connected to form separate independent circuits, supplied with current according to the present system.

In said drawings, A, represents the armature of an electric generator of the continuous current type.

B, is the commutator; and C, C', are the polar extensions of the field magnet which, for the purpose of the present invention, may be of any character and energized in any manner found desirable or convenient.

The source of current in the present system of distribution may be any form of generator of the continuous current type. I have referred to said source in most instances, as the generator; the system is, however, not limited to any particular form of generator since it is equally applicable to the distribution of high tension currents generated at a distance from the distributing machine, such an embodiment of the system comprising a continuous current generator desirably, for economy, producing and delivering to the supply circuit currents of high potential, thereby minimizing the loss in transmission. The high tension supply circuit may, of course, include any desired number of distributing machines which, when supplied with current, would be operated as motors, the high tension current entering the armature being transmitted therefrom to any desired number of circuits.

In Fig. 1 an arrangement is shown comprising four multiple arc circuits supplied by four equi-distant commutator brushes. The commutator brushes being symmetrically arranged, it follows that the difference of potential between the conductors of the said four circuits will be substantially the same throughout. In this figure the brushes $b$, $b'$, are referred to as the main, being placed upon the diameter of commutation, that is, the points of greatest difference of potential upon the commutator B. Two auxiliary brushes $b^2$, $b^3$, are located at right angles to the said main brushes. Two circuit conductors 20, 21, extend from the brush $b$, and two conductors 22, 23, from the auxiliary brushes $b^2$, $b^3$. Similarly two conductors 24, 25, extend from main brush $b'$, and two conductors 26, 27, from the auxiliary brushes $b^2$, $b^3$. Translating devices D, are conventionally indicated in the several circuits it being understood that any desired form of device capable of operation in a multiple arc circuit can be included in any of the circuits indicated, in which the difference of potential corresponds to the requirements thereof.

In Fig. 2 a source of current similar to that seen in Fig. 1 is shown. For convenience of illustration I have here shown a three-wire wound metallic circuit comprising an endless conductor 28, extending from the main brush $b$. An endless conductor 29, extends from the brush $b'$, and a conductor 30, is connected at each of its extremities to the auxiliary brushes $b^2$, $b^3$. This conductor 30, is practically rendered continuous by a bridge conductor 31, spanning the auxiliary brushes $b^2$, $b^3$, and the said bridge conductor serves the further purpose of equalizing the flow of currents through the said brushes $b^2$, $b^3$, thereby maintaining the electrical balance of the armature. Assuming that the greatest difference of potential in these circuits is two hundred volts, (although, of course, it might be higher or lower if desired), translating devices connected between the conductors 28, 29, would receive current at the maximum potential, two hundred volts, whereas translating devices connected between the conductors 30, and 28, or 30, and 29, would receive current at exactly half the above mentioned tension. Other combinations might of course, be made consistent with the foregoing. Additional circuit conductors are indicated in this figure, at 32, 33, connected respectively to the main brushes $b$, $b'$, and the full difference of potential will be found between these conductors. The conductors 32, 33, might, however, be employed to supply current to the armature A, which, when the field magnets thereof were suitably energized, would rotate as a motor and in so doing would serve to distribute the said supply current through the respective circuits, as described.

In Fig. 3 is seen a system of distribution to electric railway conductors, resembling that just described, and indicating a practicable arrangement for a complex system of tracks. As indicated, three tracks are seen, M, N, O, and adjacent to each track is seen a supply conductor 36, 37, 38. The rails of the several tracks may all be electrically connected by conductors $m$, $m'$, $m^2$, in order to reduce the resistance of the return circuit. Conductor 36, is connected by conductor 39, with the main brush $g$, of the generator, while conductors 37, 38, are interconnected by two or more conductors 40, and connected to the other main brush $g'$. The return connections $m'$, $m^2$, are connected respectively to the auxiliary brushes $g^2$, $g^3$, and said brushes are united by a spanning conductor $g^4$. Translating devices, as motors K, L, L', are indicated in operative relation to the several working circuits. As here indicated, the potential of the generator may be one thousand volts, which, by the system of distribution, is divided between the respective circuits so that the potential in each circuit will be limited to one-half of that of the main generator. As before stated, the generator or electro-dynamic machine will divide the potential of the current equally, said divided current being then transmitted to two groups of circuits and further, sub-divided, if desired, but I do not limit myself to a single reduction in this manner since it may be found desirable to bring the current at an extremely high tension from some distant point and reduce it step by step through a number of machines for different purposes, the figures here given being by way of illustration. Fig. 3 also indicates means whereby the supply currents may be still further reduced by passing all or part thereof through an additional dynamo electric machine operating as a distributer. This distributer is indicated at G, its armature being lettered $A^3$. Main commutator brushes $C^2$, $C^3$, are provided, also supplementary commutator brushes $C^4$, $C^5$, these latter being placed equidistant between the main brushes and electrically connected by a suitable conductor. The main brushes $C^2$, $C^3$, are connected with one of the working circuits leading from the first distributing generator, or directly therewith, by conductors $a'$, $a^2$, and through them the current, which is here assumed to be at a potential of five hundred volts, is supplied to the said distributing armature $A^3$. A working circuit composed of conductors $a^3$, $a^4$, is connected with one of the main brushes and with one of the auxiliary brushes, and therefore, being in connection with only a part of the armature, it will receive current of one-half the potential of the supply circuit of the machine G.

It will be apparent that an arrangement of the system substantially such as has been set forth, provides a very efficient and desirable system of distributing current and one which may be made to serve a useful purpose under a great variety of conditions.

Various combinations other than those herein shown and described, can readily be made by persons skilled in the art, in accordance with the principles set forth, and I therefore do not limit myself to the exact details of this specification, the same being merely by way of illustration.

Having described my invention what I claim and desire to secure by Letters Patent is:—

1. In a system of electrical distribution, a generator of electricity; an electric motor having its field magnets and armature coils in circuit with the generator and one or more translating devices connected on one side directly to one commutator brush of the motor, and on the other side to a commutator or contact brush intermediate the motor commutator brushes.

2. A system of electrical distribution comprising an electro-dynamic machine of the continuous current type, main brushes upon the points of maximum potential of the commutator thereof, said brushes connected to independent circuits, an auxiliary set of brushes upon said commutator opposite each other and midway between the main brushes said middle brushes connected to the other side and serving as the return to the circuits supplied by the main brushes, said main and auxiliary brushes always occupying the same relation to each other and acting to distribute the potential equally among the several circuits.

3. A system of electrical distribution comprising an electro-dynamic machine giving continuous currents, main commutator brushes upon the points of maximum potential of the commutator thereof, said brushes connected to two independent circuits or groups of circuits, a second, auxiliary set of brushes upon said commutator diametrically opposite each other and midway between the main brushes, said auxiliary brushes connected to the other side of and serving as the return to the circuits supplied by the main brushes, said main and auxiliary brushes always occupying the same relation to each other and acting to divide the potential equally between the circuits or groups of circuits.

4. A system of electrical distribution comprising a source of current of relatively high potential, a plurality of circuits or groups of working circuits to be supplied with current of reduced potential, an electro-dynamic machine of the continuous current type arranged and connected to receive the supply current, connections between the main commutator brushes of said machine and one side of the working circuits, an auxiliary set of brushes upon the commutator opposite each other midway between the main brushes, said middle brushes connected to the other side of and serving as the return to the circuits supplied by the main brushes, said main and auxiliary brushes always occupying the same relation to each other and acting to distribute the potential equally among the several circuits.

5. A system of electrical distribution comprising a source of current of relatively high potential, working circuits arranged to be supplied with current of reduced potential, electro dynamic motors of the continuous current type arranged and connected to receive the supply current, connections from one of the commutator brushes of the motors to one side of the working circuits, an auxiliary brush upon the commutator midway between the main brushes, and connection from the other sides of said working circuits to the said auxiliary brushes of the motors.

In testimony whereof I hereto affix my signature in presence of two witnesses.

CHARLES J. VAN DEPOELE.

Witnesses:
FRANKLAND JANNUS,
CHAS. L. STURTEVANT.